United States Patent
Rowe et al.

(10) Patent No.: US 8,980,219 B1
(45) Date of Patent: Mar. 17, 2015

(54) STABLE COMPLEXES OF ZERO-VALENT METAL AND HYDRIDE AS NOVEL REAGENTS

(71) Applicant: Toyota Motor Engineering & Manufacturing North America, Inc., Erlanger, KY (US)

(72) Inventors: Michael Paul Rowe, Pinckney, MI (US); Rana Mohtadi, Northville, MI (US); Daniel Jeffrey Herrera, Questa, NM (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/046,081

(22) Filed: Oct. 4, 2013

(51) Int. Cl.
*C01B 6/02* (2006.01)
*B02C 17/00* (2006.01)
*C01B 6/00* (2006.01)

(52) U.S. Cl.
CPC .. *C01B 6/006* (2013.01); *C01B 6/02* (2013.01)
USPC ................. 423/644; 241/26; 241/27

(58) Field of Classification Search
CPC .......... C01B 6/00; C01B 6/003; C01B 6/006; C01B 6/02; C01B 6/04; C01B 6/06
USPC ...................... 423/644; 241/26, 27
See application file for complete search history.

(56) References Cited

U.S. PATENT DOCUMENTS

| 7,041,350 B1 * | 5/2006 | Rule et al. ............ 428/35.7 |
| 2005/0217427 A1 | 10/2005 | Suthersan et al. |
| 2009/0264277 A1 | 10/2009 | Raj et al. |

FOREIGN PATENT DOCUMENTS

| JP | 2011-122202 | 6/2011 |
| WO | WO2012007830 A1 * | 1/2012 |

OTHER PUBLICATIONS

Wronski et al., "A new nanonickel catalyst for hydrogen storage in solid-state magnesium hydrides", Int. J. Hydrogen Energy, 36, 1159-1166, 2011.
Chen et al., "Improved Dehydrogenation Properties of Ca(BH4)2•nNH3 (n=1, 2, and 4) Combined with Mg(BH4)2," J. Phys. Chem., 116, 21162-21168, Sep. 2012.
Varin et al, "The effects of ball milling and nanometrick nickel additive on the hydrogen desorption from lithium borohydride and manganese chloride (3LiBH4+MnCl2) mixture", Int. J. Hydrogen Energy, 35 (2010) 3588-3597.
Rowe, "Stable Complexes of Zero-Valent Metallic Element and Hydride as Novel Reagents". U.S. Appl. No. 14/219,823, filed Mar. 19, 2014.
Rowe, "Stable Complexes of Multiple Zero-Valent Metals and Hydride as Novel Reagents". U.S. Appl. No. 14/219,815, filed Mar. 19, 2014.
Rowe, "Stable Complexes of Zero-Valent Metallic Element and Hydride as Novel Reagents". U.S. Appl. No. 14/269,895, filed May 5, 2014.
Rowe et al., "Stable Complexes of Non-Metal Elements and Hydride as Novel Reagents". U.S. Appl. No. 14/269,909, filed May 5, 2014.
Imamura et al., "Dehydriding of Sn/MgH2 nanocomposite formed by ball milling of MgH2 with Sn", Int. J. Hydrogen Energy, 32, 4191-4194, Jul. 2007.
Schütch et al, "Light metal hydrides and complex hydrides for hydrogen storage", 2004, Chem. Commun., pp. 2249-2258.

* cited by examiner

*Primary Examiner* — Stanley Silverman
*Assistant Examiner* — Syed Iqbal
(74) *Attorney, Agent, or Firm* — Christopher G. Darrow; Young Basile Hanlon & MacFarlane P.C.

(57) ABSTRACT

A composition and its method of production are provided. The composition includes at least one zero-valent metal atom in complex with at least one hydride molecule. The method of production includes ball-milling an elemental metal in a high-surface area form, with a hydride. The composition can be useful as a reagent for the synthesis of zero-valent metallic nanoparticles.

25 Claims, 7 Drawing Sheets

STABLE COMPLEXES OF ZERO-VALENT METAL AND HYDRIDE AS NOVEL REAGENTS

TECHNICAL FIELD

The present invention relates in general to a composition of matter composed of zero-valent metal in stable complex with one or more hydride molecules and in particular to zero-valent manganese or tin in complex with lithium borohydride, and also to a method for synthesizing the complex.

BACKGROUND

Hydrides, compounds in which metals or metalloids are bound directly to hydrogen, are relatively energetic molecules with a large variety of known and developing applications in chemistry and energy technology. Such applications include uses as reducing agents, hydrogenation catalysts, desiccants, potent bases, components in rechargeable batteries, and potentially as solid hydrogen storage vehicles in fuel cell technology.

Metal nanoparticles, particles of elemental metal in pure or alloyed form with a dimension less than 100 nm, have unique physical, chemical, electrical, magnetic, optical, and other properties in comparison to their corresponding bulk metals. As such they are in use or under development in fields such as chemistry, medicine, energy, and advanced electronics, among others.

Synthetic methods for metallic nanoparticles are typically characterized as being "top-down" or "bottom-up" and comprise a variety of chemical, physical, and even biological approaches. Top-down techniques involve the physical breakdown of macroscale metallic particles, using a variety of energy inputs, into nanoscale particles. Bottom-up methods involve the formation of nanoparticles from isolated atoms, molecules, or clusters.

Physical force methods for top-down metal nanoparticle synthesis have included milling of macroscale metal particles, laser ablation of macroscale metals, and spark erosion of macroscale metals. Chemical approaches to bottom-up synthesis commonly involve the reduction of metal salt to zero-valent metal with nucleation seed particles or self-nucleation and growth into metal nanoparticles.

While each of these methods can be effective in certain circumstances, each also has disadvantages or situational inapplicability. Direct milling methods can be limited in the size of particles obtainable (production of particles smaller than ~20 nm is often difficult) and can lead to loss of control of the stoichiometric ratios of alloys. Other physical methods can be expensive or otherwise unamenable to industrial scale. On the other hand, chemical reduction techniques can fail, for example in situations where metallic cations are resistant to chemical reduction. Mn(II) for example is virtually impervious to insitu chemical reduction, making this approach inapplicable to the preparation of $Mn^0$, or $Mn^0$-containing, nanoparticles.

SUMMARY

A composition of zero-valent metal in complex with hydride and a method of synthesizing the composition are provided.

In one aspect a reagent complex according to the following formula is disclosed:

$$M^0 \cdot X_y \qquad \qquad \text{I,}$$

wherein $M^0$ is a zero-valent metal, X is a hydride, and y is an integral or fractional value greater than zero. In some variations, the zero-valent metal can be a transition metal or a post-transition metal, the hydride can be a complex metalloid hydride, and y can be four or less. In some instances, the zero-valent metal can be manganese or tin, the hydride can be lithium borohydride, and y can be one or two.

In another aspect a method for synthesizing a reagent complex is disclosed. The method includes mixing hydride with a preparation containing a zero-valent metal and ball-milling the mixture. In some variations, the zero-valent metal can be a transition metal or a post-transition metal, the hydride can be a complex metalloid hydride, and metallic hydride can be mixed with the preparation containing a zero-valent metal in a stoichiometric ratio of about 1:1 to 4:1, inclusive. In some instances, the preparation containing a zero-valent metal can be a preparation of manganese or tin, the hydride can be lithium borohydride, and metallic hydride can be mixed with the preparation containing a zero-valent metal in a stoichiometric ratio of about 1:1 to 2:1, inclusive.

In another aspect a composition is provided, the composition including a reagent complex synthesized by a method comprising mixing a preparation containing a zero-valent metal with a hydride to produce a mixture and ball-milling the mixture to produce a complex.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Figure 1A:
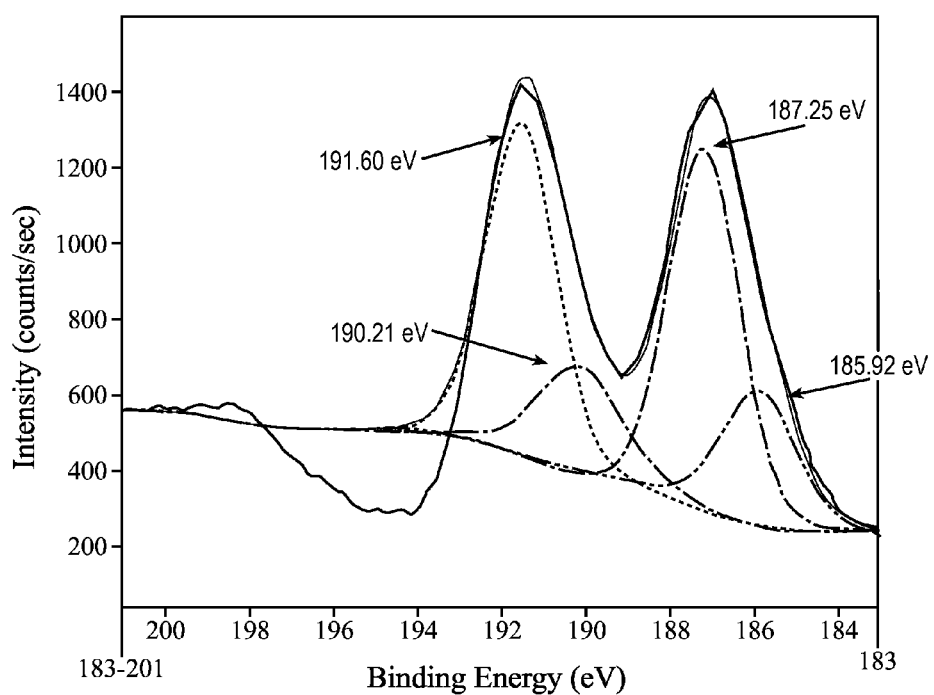
FIG. 1A is a boron x-ray photoelectron spectrum of a $LiBH_4$.

Compositions of zero-valent metals in complex with hydrides and methods of synthesizing the compositions are described. A zero-valent metal can alternatively be described as a metal which is in oxidation state zero or as an elemental metal.

As used here, a "metal" can refer to an alkaline earth metal, an alkali metal, a transition metal, or a post-transition metal. The phrase "transition metal" can refer to any D-block metal of Groups 3 through 12. The phrase "post-transition metal" can refer to Group 13 through 16 metals.

As used here, a "hydride" can be a binary metal hydride (e.g. NaH, or $MgH_2$), a binary metalloid hydride (e.g. $BH_3$), a complex metal hydride (e.g. $LiAlH_4$), or a complex metalloid hydride (e.g. $LiBH_4$ or $Li(CH_3CH_2)_3BH$). In some examples the hydride will be $LiBH_4$. The term "metalloid" can refer to any of boron, silicon, germanium, arsenic, antimony, tellurium, or polonium. The term hydride as described above can in some variations include a corresponding deuteride or tritide.

A reagent complex is disclosed, comprising a complex according to Formula I:

$$M^0\text{-}X_y \qquad\qquad I,$$

wherein $M^0$ is a zero-valent metal, derived from the preparation containing a zero-valent metal, wherein X is a hydride, and wherein y is an integral or fractional value greater than zero.

Uses of the reagent complex can include as a reactant in bottom-up synthesis of metal nanoparticles, either pure or alloyed. The reagent complex can be useful in producing, in different instances, metal nanoparticles composed of any of a variety of metals and of a variety of nanoparticulate sizes. In some instances the reagent complex can be useful in producing metal nanoparticles which are substantially free of metal oxides.

Referring now to Formula I, the zero-valent metal can be any zero-valent metal. In some aspects the zero-valent metal can be a zero-valent transition metal or a zero-valent post-transition metal. Suitable transition metals include, but are not limited to cadmium, cobalt, copper, chromium, iron, manganese, gold, silver, platinum, titanium, nickel, niobium, molybdenum, rhodium, palladium, scandium, vanadium, and zinc. Suitable post-transition metals include aluminum, gallium, indium, tin, thallium, lead, or bismuth. In some instances the zero-valent metal can be manganese or tin.

In various aspects, the hydride as incorporated in the reagent complex can be any hydride, including binary metal hydride, binary metalloid hydride, complex metal hydride, or complex metalloid hydride. In some variations, the hydride can be a complex metalloid hydride. In some instances, the hydride can be a borohydride. In some instanced, the hydride can be lithium borohydride.

The reagent complex described by Formula I can be a complex of individual molecular entities, such as a single zero-valent metal atom complexed with one or more hydride molecules. Alternatively the reagent complex described by Formula I can exist as a discrete molecule, such as a zero-valent metal atom interacting with a salt hydride, a molecular cluster, such as a cluster of zero-valent metal atoms interspersed with hydride molecules, or a cluster of zero-valent metal, the cluster surface-coated with hydride molecules or the cluster interspersed with salt hydride molecules.

The value y according to Formula I can define the stoichiometry of hydride molecules to zero-valent metal atoms in the reagent complex. The value of y can include any integral or fractional value greater than zero. In some instances, y can be an integral or fractional value less than or equal to four. In some instances, y can be an integral or fractional value less than or equal to two. In some instances, y can be an integral or fractional value less than or equal to one.

A method for synthesizing a reagent includes the step of ball-milling a mixture of hydride with a preparation containing zero-valent metal. The resulting reagent, alternatively referred to herein as a reagent complex, comprises a complex according to Formula I:

$$M^0\text{-}X_y \qquad\qquad I,$$

wherein $M^0$ is at least one metal atom in oxidation state zero, derived from the preparation containing a zero-valent metal, wherein X is a hydride molecule, and wherein y is an integral or fractional value greater than zero.

The preparation containing a zero-valent metal can be any composition consisting substantially of a zero-valent metal. In many instances the preparation containing a zero-valent metal will include zero-valent metal in a form which possesses a high surface-area-to-mass ratio. In some instances the zero-valent metal will be present in a powder form with a particulate size of −325 mesh. It is contemplated that the preparation containing a zero-valent metal can be a highly porous zero-valent metal, a zero-valent metal with a honeycomb structure, or some other preparation with a high surface-area-to-mass ratio.

In some instances the preparation containing a zero-valent metal can include a zero-valent transition metal. Suitable transition metals include, but are not limited to cadmium, cobalt, copper, chromium, iron, manganese, gold, silver, platinum, titanium, nickel, niobium, molybdenum, rhodium, palladium, scandium, vanadium, and zinc. In some instances the preparation containing a zero-valent metal can include a post-transition metal. Suitable post-transition metals include aluminum, gallium, indium, tin, thallium, lead, or bismuth.

It is to be understood that the zero-valent metal, be it transition metal, post-transition metal, alkali metal, or alkaline earth metal, will be in oxidation state zero. As used herein, "zero-valent" and "in oxidation state zero" are taken to mean that the material can exhibit a substantial but not necessarily complete zero oxidation state. For example, the preparation containing a zero-valent metal can include some surface impurities such as oxides.

It is contemplated that the phrase "high-surface-area-to-mass ratio" can encompass a broad range of surface-area-to-mass ratios and that, in general, the surface-area-to-mass ratio of the preparation containing a zero-valent metal employed will be that which is required by the time constraints of the method for synthesizing a reagent. In general, a higher surface-area-to-mass ratio of the preparation containing a zero-valent metal will lead to a more rapid completion of the method for synthesizing a reagent. In cases in which the preparation containing a zero-valent metal is composed of a powder of a zero-valent metal, smaller particle size of the powder of a zero-valent metal will lead to a more rapid completion of the method for synthesizing a reagent.

In some variations of the method for synthesizing a reagent, the hydride and the preparation containing a zero-valent metal can be present in a 1:1 stoichiometric ratio of hydride molecules to metal atoms contained in the preparation containing a zero-valent metal during the ball-milling step. In other variations the stoichiometric ratio can be 2:1, 3:1, 4:1 or higher. In some variations the stoichiometric ratio of hydride to elemental metal atoms in the preparation containing a zero-valent metal can also include fractional quantities, such as 2.5:1.

The reagent complex described by Formula I can be a complex of individual molecular entities, such as a single zero-valent metal atom complexed with one or more hydride molecules. Alternatively the reagent complex described by Formula I can exist as a molecular cluster, such as a cluster of zero-valent metal atoms interspersed with hydride molecules, or a cluster of zero-valent metal, the cluster surface-coated with hydride molecules or the cluster interspersed with salt hydride molecules.

The following paragraphs describe certain analytical approaches by which the method for synthesizing a reagent can by assessed and by which formation of a reagent complex according to Formula I can be determined. The approaches discussed do not present an exhaustive list of means by which performance of the method can be assessed or by which formation of a reagent complex according to Formula I can be determined.

Figure 1B:
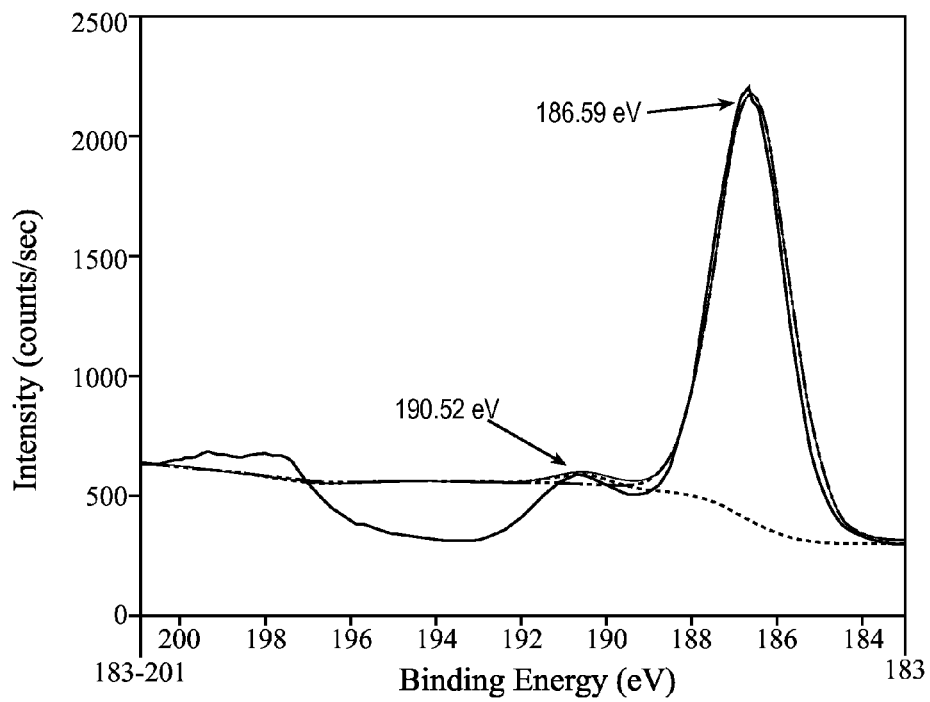
FIG. 1B is a boron x-ray photoelectron spectrum of a $Mn.LiBH_4$ complex synthesized by a disclosed method for synthesizing a reagent complex.
Figure 1C:
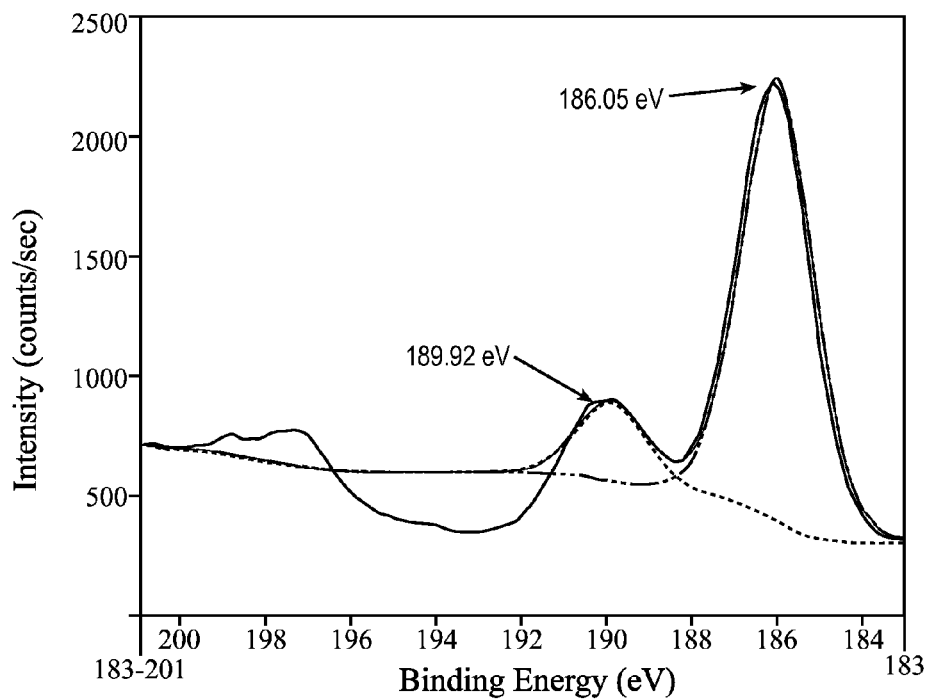
FIG. 1C is a boron x-ray photoelectron spectrum of a $Mn.(LiBH_4)_2$ complex synthesized by the disclosed method for synthesizing a reagent complex.

FIGS. 1A, 1B, and 1C show x-ray photoelectron spectroscopy (XPS) scans in the boron region of uncomplexed hydride ($LiBH_4$) and of two reagent complexes containing $LiBH_4$ according to Formula I, where y is 1 and 2 in FIGS. 1B and 1C, respectively. Heavy solid lines show the raw XPS data while light solid lines show adjusted data. Dashed and/or dotted lines show deconvoluted individual peaks. The uncomplexed $LiBH_4$ of FIG. 1A shows two large peaks centered at 191.60 and 187.25 eV and two smaller peaks centered at 190.21 and 185.92 eV.

Comparing now FIG. 1B to FIG. 1A, ball-milling of the $LiBH_4$ with an equimolar quantity of a preparation containing zero-valent manganese virtually eliminates three of the boron peaks, with only a peak centered at 186.59 eV remaining. The change in boron XPS spectrum of the $LiBH_4$, resulting from ball-milling with the preparation of a zero-valent metal, can be taken as indicative of formation of a complex according to Formula I. As shown by comparison to FIG. 1C, ball-milling of $LiBH_4$ with a 2-fold molar excess of zero-valent manganese, instead of an equimolar quantity, leads to re-emergence of a boron peak centered at 189.92 eV. This could indicate that a portion of $LiBH_4$ is uncomplexed.

Figure 2A:
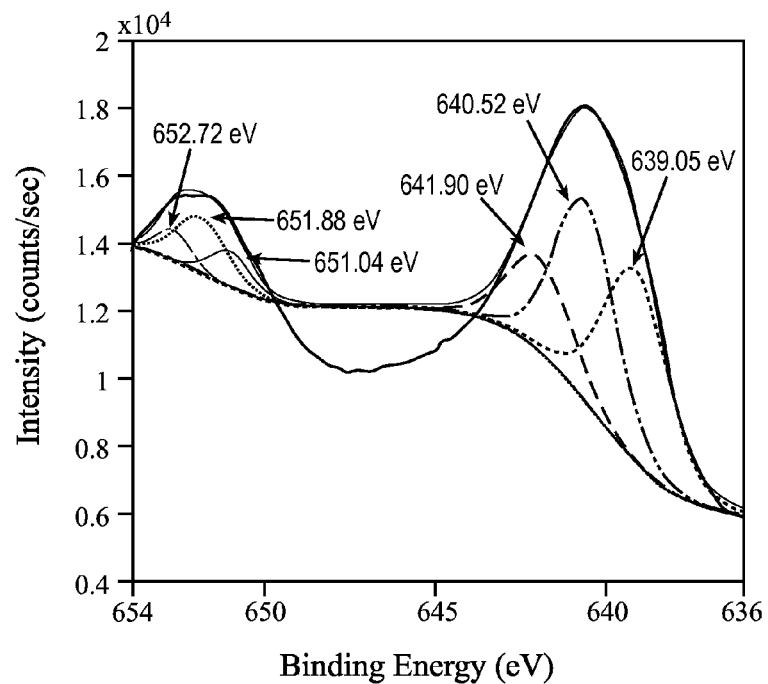
FIG. 2A is a manganese x-ray photoelectron spectrum of $Mn^0$ powder.
Figure 2B:
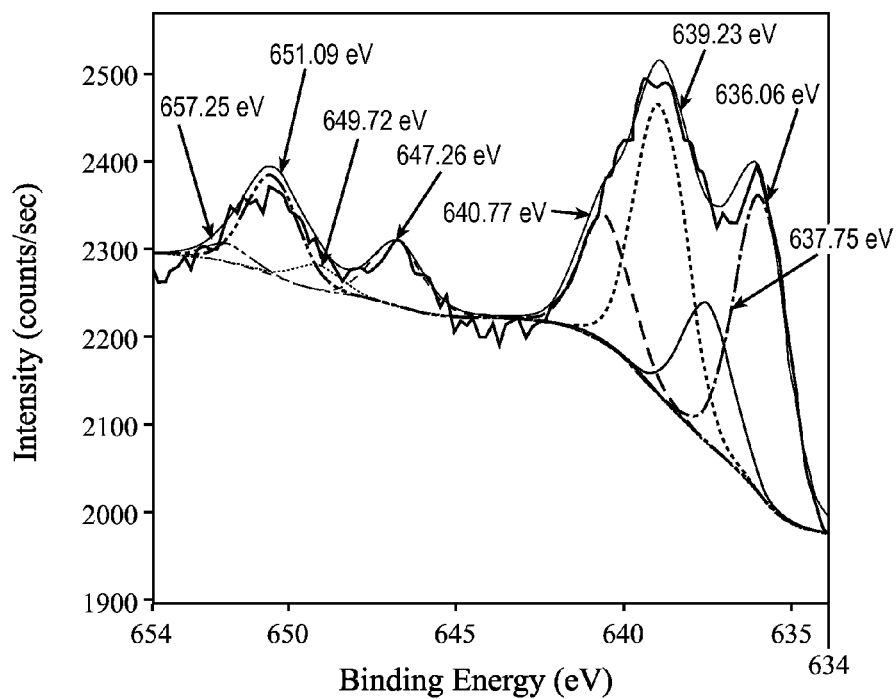
FIG. 2B is a manganese x-ray photoelectron spectrum of a $Mn.(LiBH_4)_2$ complex synthesized by the disclosed method for synthesizing a reagent complex.
Figure 2C:
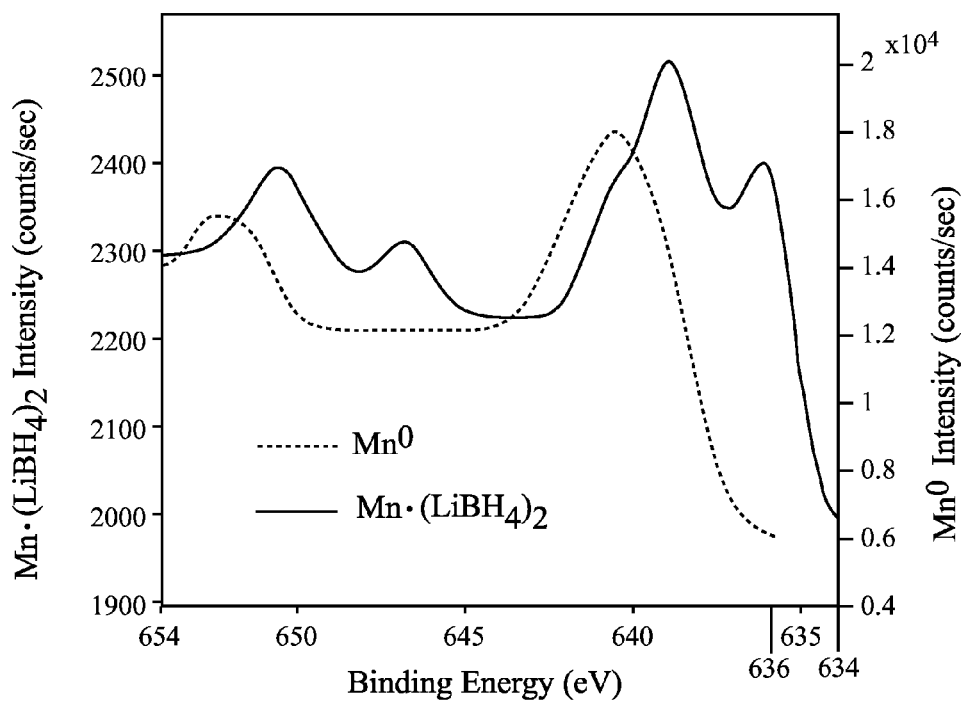
FIG. 2C is an overlay of the x-ray photoelectron spectrum of $Mn^0$ powder of FIG. 2A and the x-ray photoelectron spectrum of a $Mn.(LiBH_4)_2$ complex of FIG. 2B.

FIG. 2A shows XPS scan of a preparation containing zero-valent manganese metal. FIG. 2B shows the XPS scan of a reagent complex as described by Formula I, containing the zero-valent manganese metal of FIG. 2A in complex with 2-fold molar excess of $LiBH_4$. Heavy solid lines again show the raw XPS data while light solid lines show adjusted data. Dashed and/or dotted lines show deconvoluted individual peaks. As seen in FIG. 2A, the spectrum of the preparation containing zero-valent manganese metal includes two broad peaks, each consisting of three component peaks observable after deconvolution. Referring now to FIG. 2A and focusing on the spectral region from ~639-642 eV, the three component peaks for the preparation containing zero-valent manganese metal can be assigned, based on published references, to manganese-oxide species (640.52 eV and 641.90 eV) and zero-valent manganese (639.05 eV). The ball-milled reagent complex represented in FIG. 2B has lost the oxide peak at 641.90 eV but retains the oxide peak at 640.52 eV (considered to be the same as the actual peak of FIG. 2B appearing at 640.77 eV after negligible shifting) and the zero-valent manganese peak at 639.05 eV (after negligible shifting). However a new phase is observed with component peaks at 637.75 eV and 636.06 eV. These latter two can be assigned to manganese in complex with the hydride. An overlay of the acquired manganese XPS data for manganese powder and ball-milled Mn.$(LiBH_4)_2$ reagent complex is shown in FIG. 2C. The comparison illustrates the loss of at least one oxide species, and the general shift toward lower electronic binding energies.

Figure 3A:
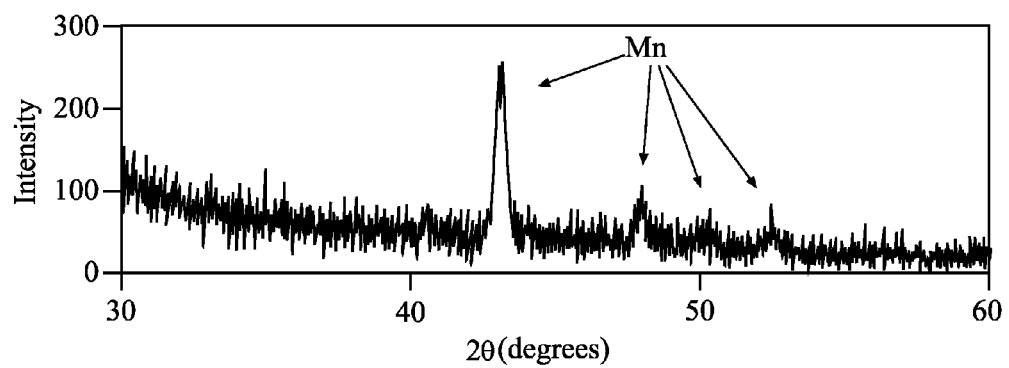
FIG. 3A is an x-ray powder diffraction scan of a $Mn.LiBH_4$ complex synthesized by the disclosed method for synthesizing a reagent complex.
Figure 3B:
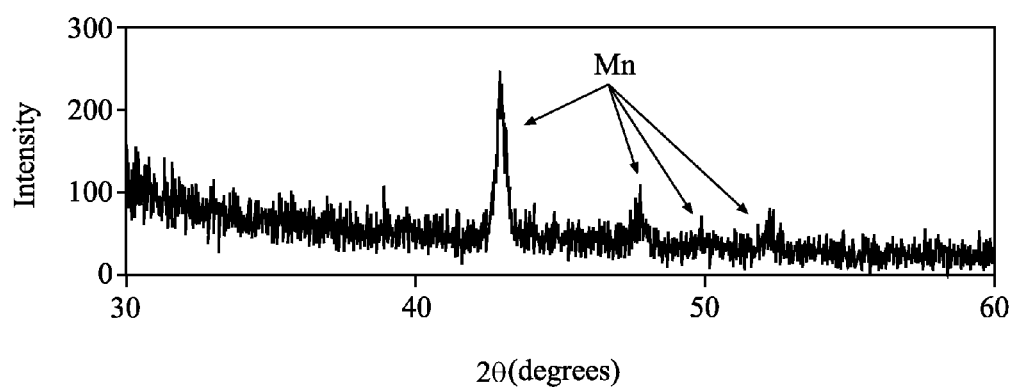
FIG. 3B is an x-ray powder diffraction scan of a $Mn.(LiBH_4)_2$ complex synthesized by the disclosed method for synthesizing a reagent complex.

FIGS. 3A and 3B show XRD spectra of reagent complexes wherein a preparation containing zero-valent manganese metal was ball-milled with an equimolar amount or a two-fold molar excess of $LiBH_4$, respectively. Both diffraction analyses suggest the presence of manganese particles with an average maximum dimension of 20 nm. Neither diffraction analysis shows evidence of $LiBH_4$.

Figure 4:
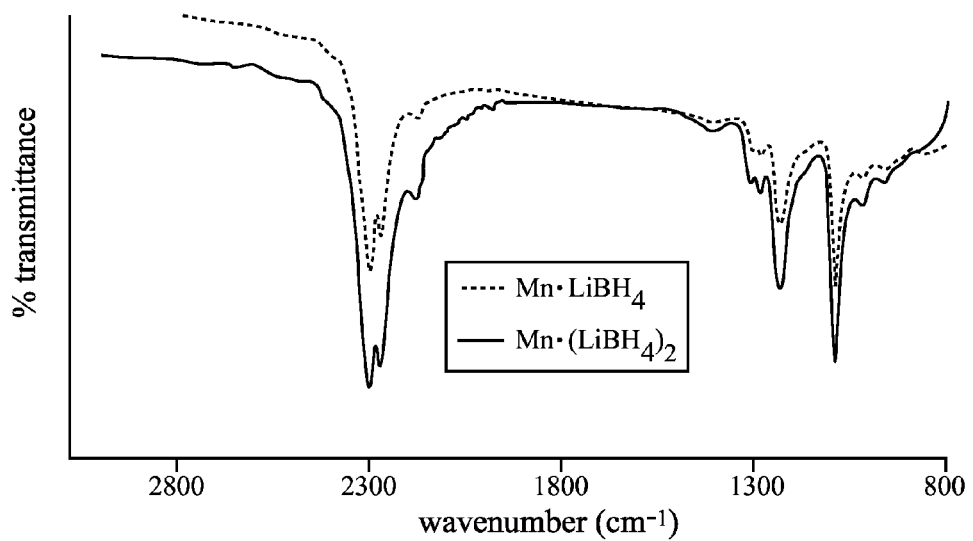
FIG. 4 is an overlay of an FT-IR spectrum of a $Mn.LiBH_4$ complex synthesized by the method of FIG. 1 and an $Mn.(LiBH_4)_2$ complex synthesized by the disclosed method for synthesizing a reagent complex.

An overlay of FT-IR scans for reagent complexes Mn.$LiBH_4$ and Mn.$(LiBH_4)_2$ is seen in FIG. 4. Both spectra have dominant features at 2299, 1230, and 1092 $cm^{-1}$ corresponding to IR-active modes of $BH_4^-$. While the results of FIGS. 1B and 1C strongly suggested that an electronic alteration of the boron had occurred, with respect to the state of boron in the authentic lithium borohydride, as a result of the ball-milling step of the method for synthesizing a reagent, the results in FIG. 4 indicate that the tetrahedral structure of the $BH_4^-$ is essentially unperturbed by the method. This result further suggests that the hydride retains its essential structure and activity in the complex of Formula I.

Figure 5A:
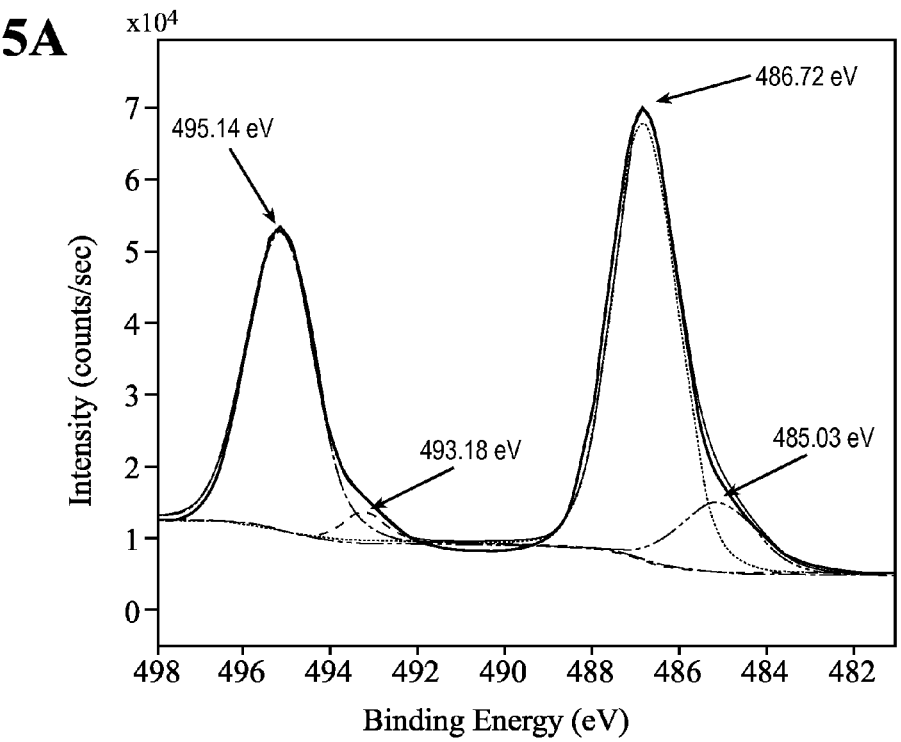
FIG. 5A is a tin x-ray photoelectron spectrum of $Sn^0$ powder.
Figure 5B:
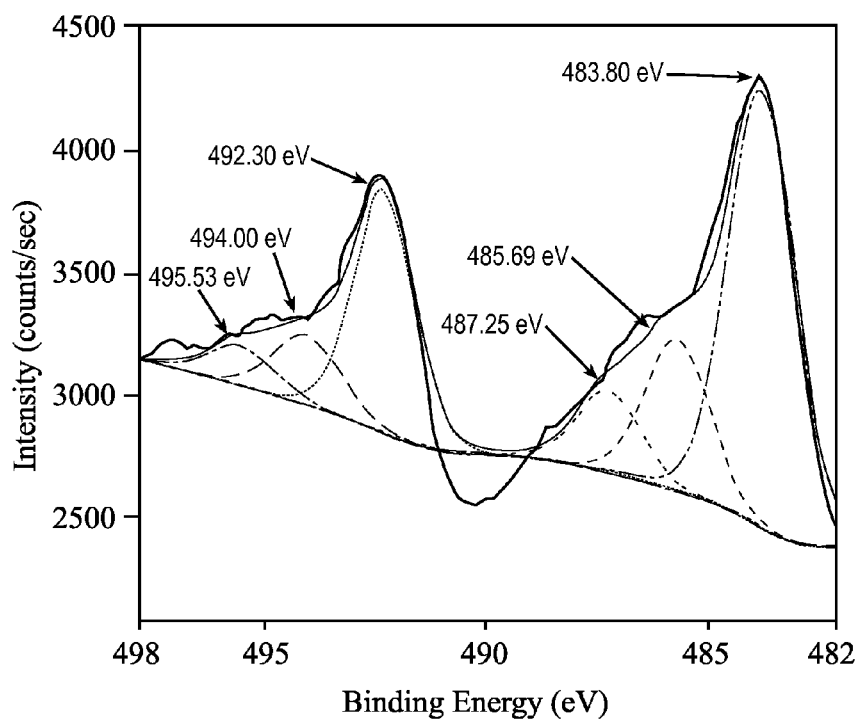
FIG. 5B is a tin x-ray photoelectron spectrum of an $Sn.(LiBH_4)_2$ complex synthesized by the disclosed method for synthesizing a reagent complex.

In FIG. 5A, an XPS scan is shown for a different preparation of a zero-valent metal; this preparation is of zero-valent tin metal. FIG. 5B shows the corresponding XPS scan of a reagent complex in which the zero-valent tin metal is in complex with a two-fold molar excess of hydride, $LiBH_4$. In FIGS. 5A and 5B, the heavy solid lines represent the raw XPS data while light solid lines show the adjusted data. Various dashed and/or dotted lines represent individual component peaks derived from peak deconvolution. Two major peaks at 495.14 and 486.72 eV and two minor peaks 493.18 and 485.03 eV in the preparation of zero-valent tin metal (FIG. 5A) shift substantially and/or disappear upon ball-milling with the hydride. In their places, the reagent complex Sn.$(LiBH_4)_2$ has major peaks at 492.30 and 483.80 eV with minor peaks at 495.53, 494.00, 487.25 and 485.69 eV (FIG. 5B).

Figure 5C:
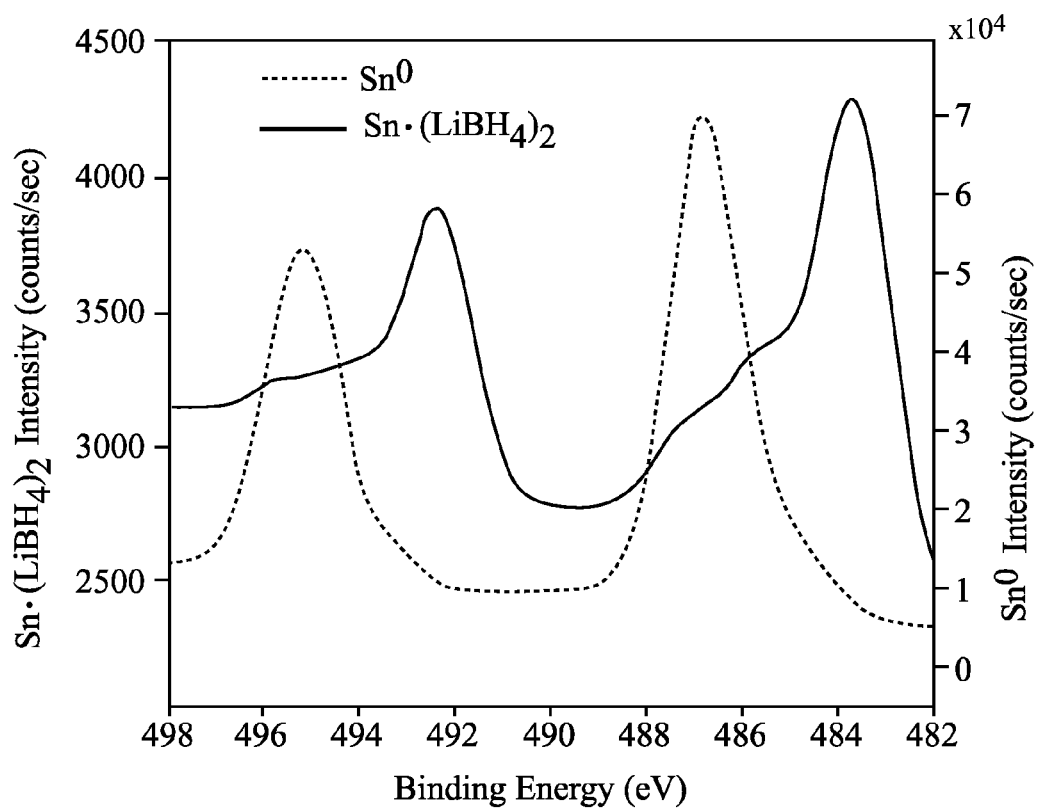
FIG. 5C is an overlay of the x-ray photoelectron spectrum of $Sn^0$ powder of FIG. 5A and the x-ray photoelectron spectrum of a $Sn.(LiBH_4)_2$ complex of FIG. 5B.

An overlay of the adjusted XPS data for the preparation containing zero-valent tin metal and the corresponding reagent complex comprising zero-valent tin and hydride, shown in FIG. 5C, also indicates the complexation of zero-valent tin with a hydride is accompanied by a spectral shift to lower electronic binding energies in the tin region XPS.

Also disclosed is a reagent complex as described above by Formula I:

$$M^0\text{-}X_y \qquad\qquad\qquad I,$$

wherein $M^0$ is a zero-valent metal, derived from the preparation containing a zero-valent metal, wherein X is a hydride, and wherein y is an integral or fractional value greater than zero; and additionally as prepared by a method for synthesizing a reagent comprising the step of ball-milling a hydride with a preparation containing a zero-valent metal.

The zero-valent metal can be any zero-valent metal. In some aspects the zero-valent metal can be a zero-valent transition metal or a zero-valent post-transition metal. Suitable transition metals include, but are not limited to cadmium, cobalt, copper, chromium, iron, manganese, gold, silver, platinum, titanium, nickel, niobium, molybdenum, rhodium, palladium, scandium, vanadium, and zinc. Suitable post-transition metals include aluminum, gallium, indium, tin, thallium, lead, or bismuth. In some instances the zero-valent metal can be manganese or tin.

In various aspects, the hydride as incorporated in the reagent complex can be any hydride, including binary metal hydride, binary metalloid hydride, complex metal hydride, or complex metalloid hydride. In some variations, the hydride can be a complex metalloid hydride. In some instances, the hydride can be a borohydride. In some instanced, the hydride can be lithium borohydride.

The reagent complex described by Formula I can be a complex of individual molecular entities, such as a single zero-valent metal atom in complex with one or more hydride molecules. Alternatively the reagent complex described by Formula I can exist as a molecular cluster, such as a cluster of zero-valent metal atoms interspersed with hydride molecules, or a cluster of zero-valent metal, the cluster surface-coated with hydride molecules or the cluster interspersed with salt hydride molecules.

The value y according to Formula I can define the stoichiometry of hydride molecules to zero-valent metal atoms in the reagent complex. The value of y can include any integral or fractional value greater than zero. In some instances, y can be an integral or fractional value less than or equal to four. In some instances, y can be an integral or fractional value less than or equal to two. In some instances, y can be an integral or fractional value less than or equal to one.

The preparation containing a zero-valent metal can be any composition consisting substantially of a zero-valent metal. In many instances the preparation containing a zero-valent metal will include zero-valent metal in a form which possesses a high surface-area-to-mass ratio. In some instances the zero-valent metal will be present in a powder form with a particulate size of −325 mesh. It is contemplated that the preparation containing a zero-valent metal can be a highly porous zero-valent metal, a zero-valent metal with a honeycomb structure, or some other preparation with a high surface-area-to-mass ratio.

The present invention is further illustrated with respect to the following examples. It needs to be understood that these examples are provided to illustrate specific embodiments of the present invention and should not be construed as limiting the scope of the present invention.

Example 1

One part manganese metal powder, of −325 mesh particle size, is mixed with one part or two parts LiBH$_4$, of total manganese metal and lithium borohydride powder mass of less than 10 grams, and ball-milled in a planetary ball-mill for 4 hours at 400 rpm (using a Fritsch pulervisette 7 planetary ball mill) in a 250 mL stainless steel airtight ball-mill jar with one ¾ inch, three ½ inch, and five ¼ inch 316 stainless steel ball bearings.

Example 2

One part tin metal powder, of −325 mesh particle size, is mixed with one part or two parts LiBH$_4$, of total tin metal and lithium borohydride powder mass of less than 10 grams, and ball-milled in a planetary ball-mill for 4 hours at 400 rpm (using a Fritsch pulervisette 7 planetary ball mill) in a 250 mL stainless steel airtight ball-mill jar with 1¾ inch, 3½ inch, and 5¼ inch 316 stainless steel ball bearings.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A reagent complex according to Formula I, $$M^0 \cdot X_y \qquad \qquad I,$$

wherein $M^0$ is a zero-valent metal having oxidation state zero, X is a hydride, and y is an integral or fractional value greater than zero; and
wherein the hydride can be any of a binary metal hydride, a binary metalloid hydride, a complex metal hydride, and a complex metalloid hydride.

2. The reagent complex of claim 1 wherein the zero-valent metal is at least one of a zero-valent transition metal or a zero-valent post-transition metal.

3. The reagent complex of claim 1 wherein the zero-valent metal is manganese or tin.

4. The reagent complex of claim 3 having an x-ray photoelectron spectroscopy peak centered at about 636 eV or 484 eV.

5. The reagent complex of claim 1 wherein the hydride is a complex metal hydride or a complex metalloid hydride.

6. The reagent complex of claim 1 wherein the hydride is lithium borohydride.

7. The reagent complex of claim 1 wherein y is about 4 or less.

8. A method comprising:
ball-milling a mixture of a hydride with a preparation containing a zero-valent metal;
wherein the method produces a reagent complex according to Formula I, $$M^0 \cdot X_y \qquad \qquad I,$$

wherein $M^0$ is the zero-valent metal having oxidation state zero, X is the hydride, and y is an integral or fractional value greater than zero; and
wherein the hydride can be any of a binary metalloid hydride, a complex metal hydride, and a complex metalloid hydride.

9. The method of claim 8 wherein the hydride is a complex metal hydride or a complex metalloid hydride.

10. The method of claim 8 wherein the hydride is lithium borohydride.

11. The method of claim 8 wherein the hydride and the preparation containing a zero-valent metal are mixed in substantially equimolar proportion.

12. The method of claim 8 wherein the hydride is mixed with the preparation containing a zero-valent metal in about four-fold or lower molar excess.

13. The method of claim 8 wherein the hydride is mixed with the preparation containing a zero-valent metal in about two-fold or lower molar excess.

14. The method of claim 8 wherein ball-milling is performed in a planetary ball mill for about 4 hours at about 400 rpm in a stainless steel airtight ball-mill jar with one ¾ inch, three inch, and five ¼ inch 316 stainless steel ball bearings.

15. The method of claim 8 which is performed in an oxygen-free environment, in an anhydrous environment, or in an environment that is oxygen-free and anhydrous.

16. The method of claim 8 wherein the preparation containing a zero-valent metal is a preparation of a transition metal or a preparation of a post-transition metal.

17. The method of claim 16 wherein the preparation containing a zero-valent metal is a preparation of manganese or tin.

18. The method of claim 17 which produces a reagent complex according to Formula I having an x-ray photoelectron spectroscopy peak centered at about 636 eV or at about 484 eV.

19. A reagent complex prepared by a method comprising:
ball-milling a mixture of a hydride with a preparation containing a zero-valent metal;
wherein the reagent complex has a formula according to Formula I, $$M^0 \cdot X_y \qquad \text{I,}$$

wherein $M^0$ is the zero-valent metal having oxidation state zero, X is the hydride, and y is an integral or fractional value greater than zero; and
wherein the hydride can be any of a binary metalloid hydride, a complex metal hydride, and a complex metalloid hydride.

20. The reagent complex of claim 19 wherein the hydride is a complex metal hydride or a complex metalloid hydride.

21. The reagent complex of claim 19 wherein the hydride is lithium borohydride.

22. The reagent complex of claim 19 wherein the method is performed in an oxygen-free environment, in an anhydrous environment, or in an environment that is oxygen-free and anhydrous.

23. The reagent complex of claim 19 wherein the preparation containing a zero-valent metal is a preparation of a transition-metal or a preparation of a post-transition metal.

24. The reagent complex of claim 23 wherein the preparation containing a zero-valent metal is a preparation of manganese or tin.

25. The reagent complex of claim 24 wherein the complex has an X-ray photoelectron spectroscopy peak centered at about 636 eV or 484 eV.

* * * * *

UNITED STATES PATENT AND TRADEMARK OFFICE
CERTIFICATE OF CORRECTION

| | |
|---|---|
| PATENT NO. | : 8,980,219 B1 |
| APPLICATION NO. | : 14/046081 |
| DATED | : March 17, 2015 |
| INVENTOR(S) | : Michael Paul Rowe et al. |

It is certified that error appears in the above-identified patent and that said Letters Patent is hereby corrected as shown below:

In the Specification

In Column 1, Line 67, "$M^0.X_y$" should be "$M^0 \cdot X_y$".

In Column 2, Line 37, "$Mn.LiBH_4$" should be "$Mn \cdot LiBH_4$".

In Column 2, Line 40, "$Mn.(LiBH_4)$" should be "$Mn \cdot (LiBH_4)$".

In Column 2, Line 45, "$Mn.(LiBH_4)$" should be "$Mn \cdot (LiBH_4)_2$".

In Column 2, Line 49, "$Mn.(LiBH_4)_2$" should be "$Mn \cdot (LiBH_4)$".

In Column 2, Line 50, "$Mn.LiBH_4$" should be "$Mn \cdot LiBH_4$".

In Column 2, Line 53, "$Mn.(LiBH_4)$" should be "$Mn \cdot (LiBH_4)$".

In Column 2, Line 56, "$Mn.LiBH_4$" should be "$Mn \cdot LiBH_4$".

In Column 2, Line 57, "$Mn.(LiBH_4)_2$" should be "$Mn \cdot (LiBH_4)_2$".

In Column 2, Line 62, "$Sn.(LiBH_4)_2$" should be "$Sn \cdot (LiBH_4)$".

In Column 2, Line 67, "$Sn.(LiBH_4)_2$" should be "$Sn \cdot (LiBH_4)_2$".

In Column 5, Line 67, "$Mn.(LiBH_4)_2$" should be "$Mn \cdot (LiBH_4)_2$".

In Column 6, Line 12, "$Mn.LiBH_4$ and $Mn.(LiBH_4)_2$" should be "$Mn \cdot LiBH_4$ and $Mn \cdot (LiBH_4)_2$".

In Column 6, Line 35, "$Sn.(LiBH_4)_2$" should be "$Sn \cdot (LiBH_4)_2$".

In the Claims

In Column 8, Line 4, "$M^0.X_y$" should be "$M^0 \cdot X_y$".

In Column 8, Line 31, "$M^0.X_y$" should be "$M^0 \cdot X_y$".

In Column 9, Line 7, "$M^0.X_y$" should be "$M^0 \cdot X_y$".

Signed and Sealed this
First Day of December, 2015

Michelle K. Lee
*Director of the United States Patent and Trademark Office*